United States Patent [19]
Wang et al.

[11] Patent Number: 5,671,255
[45] Date of Patent: Sep. 23, 1997

[54] METHOD AND APPARATUS FOR DETERMINING CODING RATE IN A WIRELESS COMMUNICATION SYSTEM

[75] Inventors: Michael Mao Wang, Champaign; Fuyun Ling, Hoffman Estates; Kenneth A. Stewart, Chicago, all of Ill.

[73] Assignee: Motorola, Inc., Schaumburg, Ill.

[21] Appl. No.: 624,233

[22] Filed: Mar. 29, 1996

[51] Int. Cl.[6] .............. H04L 27/06; H04J 3/22; G06F 11/10
[52] U.S. Cl. .............. 375/341; 371/43
[58] Field of Search .............. 375/250, 222, 375/260, 262, 340, 341; 370/342, 441; 371/43; 341/61

[56] References Cited

U.S. PATENT DOCUMENTS

| | | | |
|---|---|---|---|
| 4,462,101 | 7/1984 | Yasuda et al. | 371/43 |
| 5,115,429 | 5/1992 | Hluchyj et al. | 370/231 |
| 5,321,705 | 6/1994 | Gould et al. | 371/43 |
| 5,568,483 | 10/1996 | Padovani et al. | 370/468 |
| 5,570,379 | 10/1996 | Sasaki et al. | 371/42 |

OTHER PUBLICATIONS

"Viterbi Decoding Algorithm for Convolutional Codes with Repeat Request", Yamamoto and Itoh, IEEE Transactions on Information Theorty, vol. n–26, No. 5, Sep. 1980, pp. 540–547.

*Primary Examiner*—Young T. Tse
*Attorney, Agent, or Firm*—Richard A. Sonnentag

[57] ABSTRACT

A receiver (500) utilizes parameters generated by a Viterbi decoder (530) to determine one of a plurality of coding rates in which user information is transmitted. The receiver (500) combines the parameters in a predetermined manner, the result of which is a detection statistic (dij). By utilizing the detection statistic (dij), the coding rate at which user information is accurately determined.

8 Claims, 11 Drawing Sheets

METHOD AND APPARATUS FOR DETERMINING CODING RATE IN A WIRELESS COMMUNICATION SYSTEM

FIELD OF THE INVENTION

The present invention relates generally to wireless communication systems and, more particularly, to coding rate determination in such wireless communication systems.

BACKGROUND OF THE INVENTION

The current Code Division Multiple Access (CDMA) wireless communication system envisioned for, inter alia, cellular applications in the United States is defined by TIA/EIA/IS-95, *Mobile Station-Base Station Compatibility Standard for Dual Mode Wideband Spread Spectrum Cellular System*, July 1993. As is well known in the art, limiting the total amount of system interference in a spread spectrum system results in an increase in user capacity. One technique implemented in the IS-95 spread spectrum system to limit the total amount of system interference is variable rate coding.

Variable rate coding in a wireless communication system such as IS-95 takes advantage of the inherent silences of a typical voice communication. In IS-95, coding occurs in 20 millisecond (ms) blocks at either full rate, ½ rate, ¼ rate, or ⅛ rate. If, for example, a 20 ms block to be transmitted to a user of the spread spectrum system contained unvoiced speech or silences but was coded at full rate, interference would be added to the system unnecessarily. Such a frame can be transmitted as a ⅛ rate frame without effecting the speech quality while reducing the total amount of interference presented to the system. The ½ rate and ¼ rate are transitional rates. As stated above, reducing the total amount of interference presented to the system results in an increase in user capacity.

While the method for determining which coding rate to use on the transmitter side is well defined in document TIA/EIA/IS-96, *Speech Service Option Standard for Wideband Spread Spectrum Digital Cellular System*, April 1993 (Official Ballot Version), a receiver receiving such a variable rate coded transmission has no knowledge of which rate was actually transmitted. Since the receiver must have some knowledge of the coding rate to perform an accurate reception/demodulation of the transmission, accurately determining the coding rate in the receiver is critical to operation of a IS-95/IS-96 compatible receiver. Thus, a need exists for a method of accurately determining the coding rate in a receiver capable of receiving variable rate coded transmissions.

BRIEF DESCRIPTION OF THE DRAWINGS

FIG. 3 depicts a Walsh matrix utilized in a spread spectrum wireless communication system compatible with IS-95.

DETAILED DESCRIPTION OF A PREFERRED EMBODIMENT

Generally stated, a method of determining coding rate in a receiver implemented in a wireless communication system is disclosed. The receiver is responsive to a communication resource containing user information coded at one of a plurality of coding rates. The method generates parameters indicative of the likelihood of coding at the plurality of coding rates and combines the parameters in a predetermined manner to produce a detection statistic. Using the detection statistic, the coding rate is then determined.

In the preferred embodiment, the parameters indicative of the likelihood of coding at the plurality of coding rates further comprise cyclic redundancy check (CRC) information, symbol error rate (SER) information, and quality bit (QB) information. Likewise in the preferred embodiment, the parameters are combined in a linear discriminant function to produce the detection statistic, wherein the detection statistic represents two possible coding rates.

The above method is executed in a receiver, which comprises a receiver front end which receives and demodulates the communication resource to produce demodulated user information. A decoder, which is coupled to the receiver front end, then decodes the demodulated user information and generates parameters indicative of the likelihood of coding at the plurality of coding rates. A processor, which is coupled to the decoder, combines the parameters in a predetermined manner to produce a detection statistic and determines the coding rate based on the detection statistic.

Figure 1:
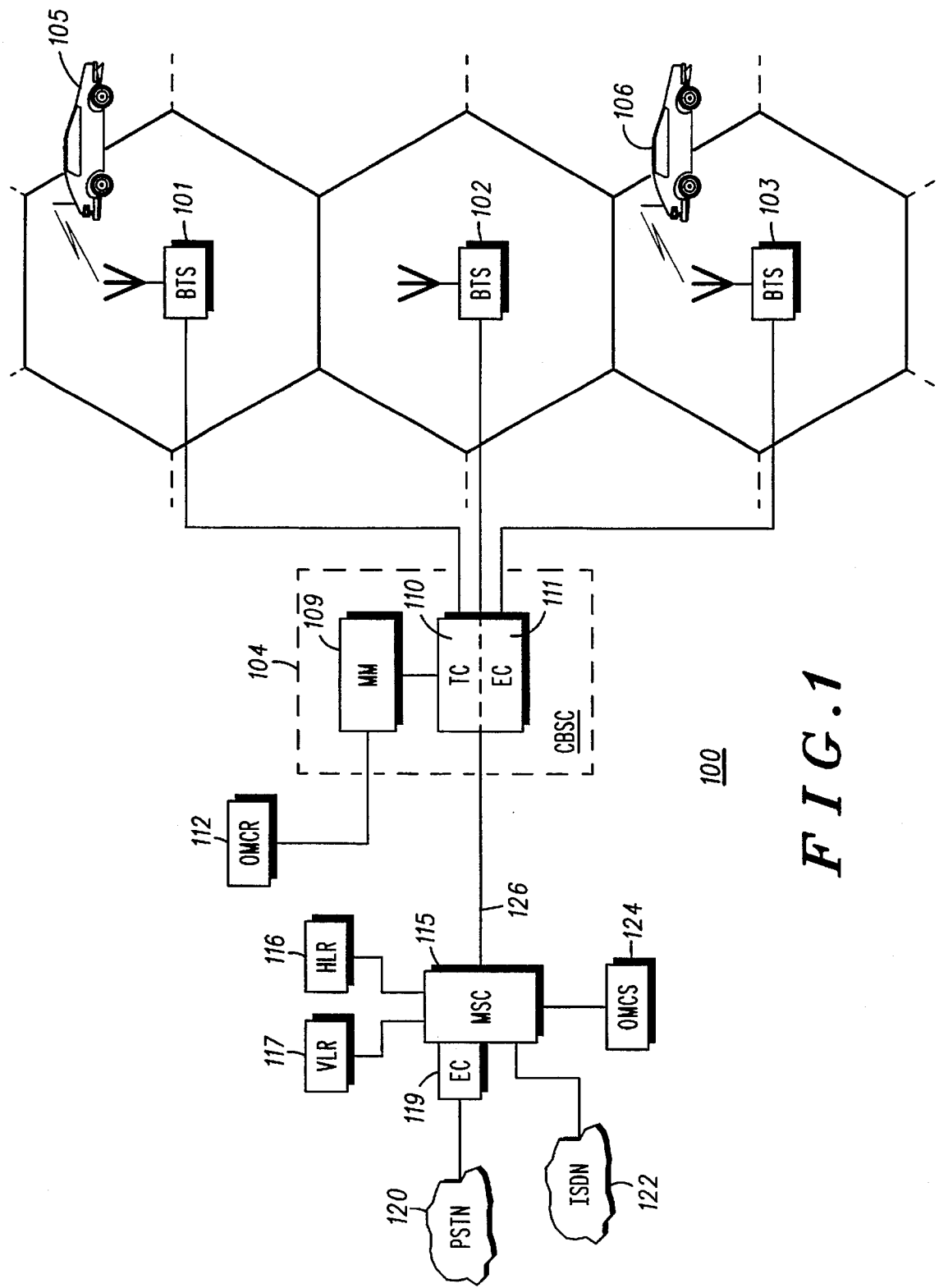
FIG. 1 generally depicts a block diagram of a wireless communication system which may beneficially implement coding rate determination in accordance with the invention.

FIG. 1 generally depicts a block diagram of a wireless communication system 100 which may beneficially implement coding rate determination in accordance with the invention. In the preferred embodiment, the wireless communication system is a code division multiple access (CDMA) cellular radiotelephone system. As one of ordinary skill in the art will appreciate, however, the coding rate determination in accordance with the invention can be implemented in any wireless communication system which implements variable rate coding.

Referring to FIG. 1, acronyms are used for convenience. The following is a list of definitions for the acronyms used in FIG. 1:

| | |
|---|---|
| BTS | Base Transceiver Station |
| CBSC | Centralized Base Station Controller |
| EC | Echo Canceller |
| VLR | Visitor Location Register |
| HLR | Home Location Register |
| ISDN | Integrated Services Digital Network |
| MS | Mobile Station |
| MSC | Mobile Switching Center |
| MM | Mobility Manager |

| | |
|---|---|
| OMCR | Operations and Maintenance Center - Radio |
| OMCS | Operations and Maintenance Center - Switch |
| PSTN | Public Switched Telephone Network |
| TC | Transcoder |

As seen in FIG. 1, multiple BTSs 101–103 are coupled to a CBSC 104. Each BTS 101–103 provides radio frequency (RF) communication to an MS 105–106. In the preferred embodiment, the transmitter/receiver (transceiver) hardware implemented in the BTSs 101–103 and the MSs 105–106 to support conveyance of the RF communication resource is substantially defined in the document titled by TIA/EIA/IS-95, *Mobile Station-Base Station Compatibility Standard for Dual Mode Wideband Spread Spectrum Cellular System*, July 1993, available from the Telecommunication Industry Association (TIA). The CBSC 104 is responsible for, inter alia, call processing via the TC 110 and mobility management via the MM 109. Other tasks of the CBSC 104 include feature control and transmission/networking interfacing. For more information on the functionality of the CBSC 104, reference is made to U.S. Pat. No. 5,475,686 to Bach et al., assigned to the assignee of the present application, and incorporated herein by reference.

Also depicted in FIG. 1 is an OMCR 112 coupled to the MM 109 of the CBSC 104. The OMCR 112 is responsible for the operations and general maintenance of the radio portion (CBSC 104 and BTS 101–103 combination) of the communication system 100. The CBSC 104 is coupled to an MSC 115 which provides switching capability between the PSTN 120/ISDN 122 and the CBSC 104. The OMCS 124 is responsible for the operations and general maintenance of the switching portion (MSC 115) of the communication system 100. The HLR 116 and VLR 117 provide the communication system 100 with user information primarily used for billing purposes. ECs 111 and 119 are implemented to improve the quality of speech signal transferred through the communication system 100.

The functionality of the CBSC 104, MSC 115, HLR 116 and VLR 117 is shown in FIG. 1 as distributed, however one of ordinary skill in the art will appreciate that the functionality could likewise be centralized into a single element. Also, for different configurations, the TC 110 could be located at either the MSC 115 or a BTS 101–103. The link 126 coupling the MSC 115 with the CBSC 104 is a T1/E1 link which is well known in the art. By plating the TC 110 at the CBSC, a 4:1 improvement in link budget is realized due to compression of the input signal (input from the T1/E1 link 126) by the TC 110. The compressed signal is transferred to a particular BTS 101–103 for transmission to a particular MS 105–106. Important to note is that the compressed signal transferred to a particular BTS 101–103 undergoes further processing at the BTS 101–103 before transmission occurs. Put differently, the eventual signal transmitted to the MS 105–106 is different in form but the same in substance as the compressed signal exiting the TC 110.

When the MS 105–106 receives the signal transmitted by a BTS 101–103, the MS 105–106 will essentially "undo" (commonly referred to as "decode") all of the processing performed by the system 100. When the MS 105–106 transmits a signal back to a BTS 101–103, the MS 105–106 likewise implements its own processing. After a signal having undergone processing is transmitted by the MS 105–106 (the processing of the signal is to change the form, but not the substance, of the signal) to a BTS 101–103, the BTS 101–103 will "undo" the processing performed on the signal and transfer to the appropriate point within the system 100. Eventually, the signal will be transferred to an end user via the T1/E1 Link 126.

Figure 2:
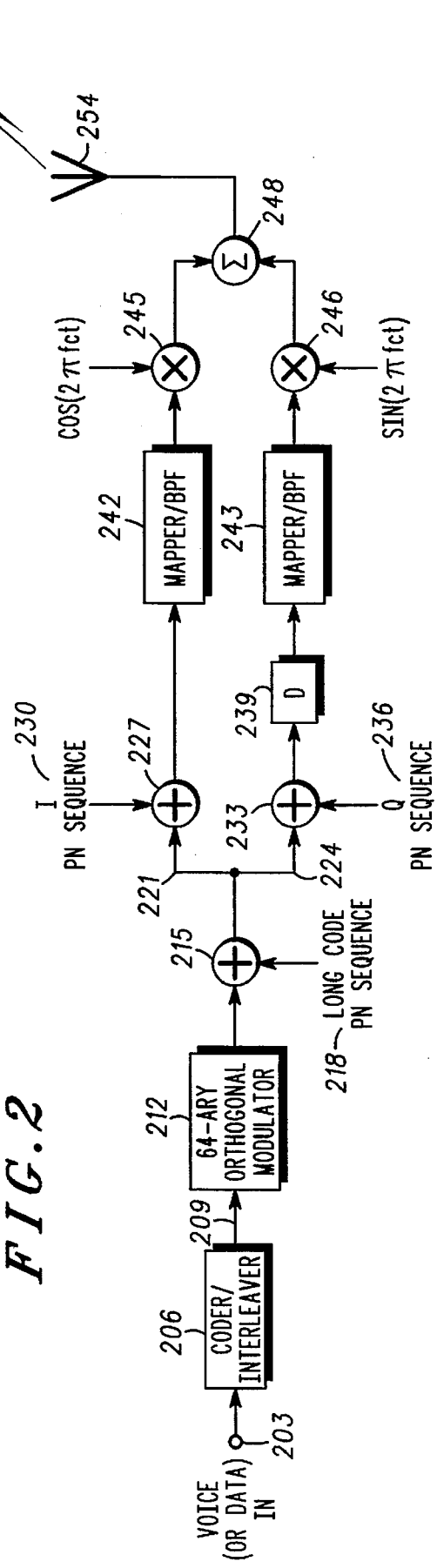
FIG. 2 generally depicts a block diagram of a transmitter implemented in a mobile station compatible with a spread spectrum wireless communication system defined by IS-95.
Figure 3A:
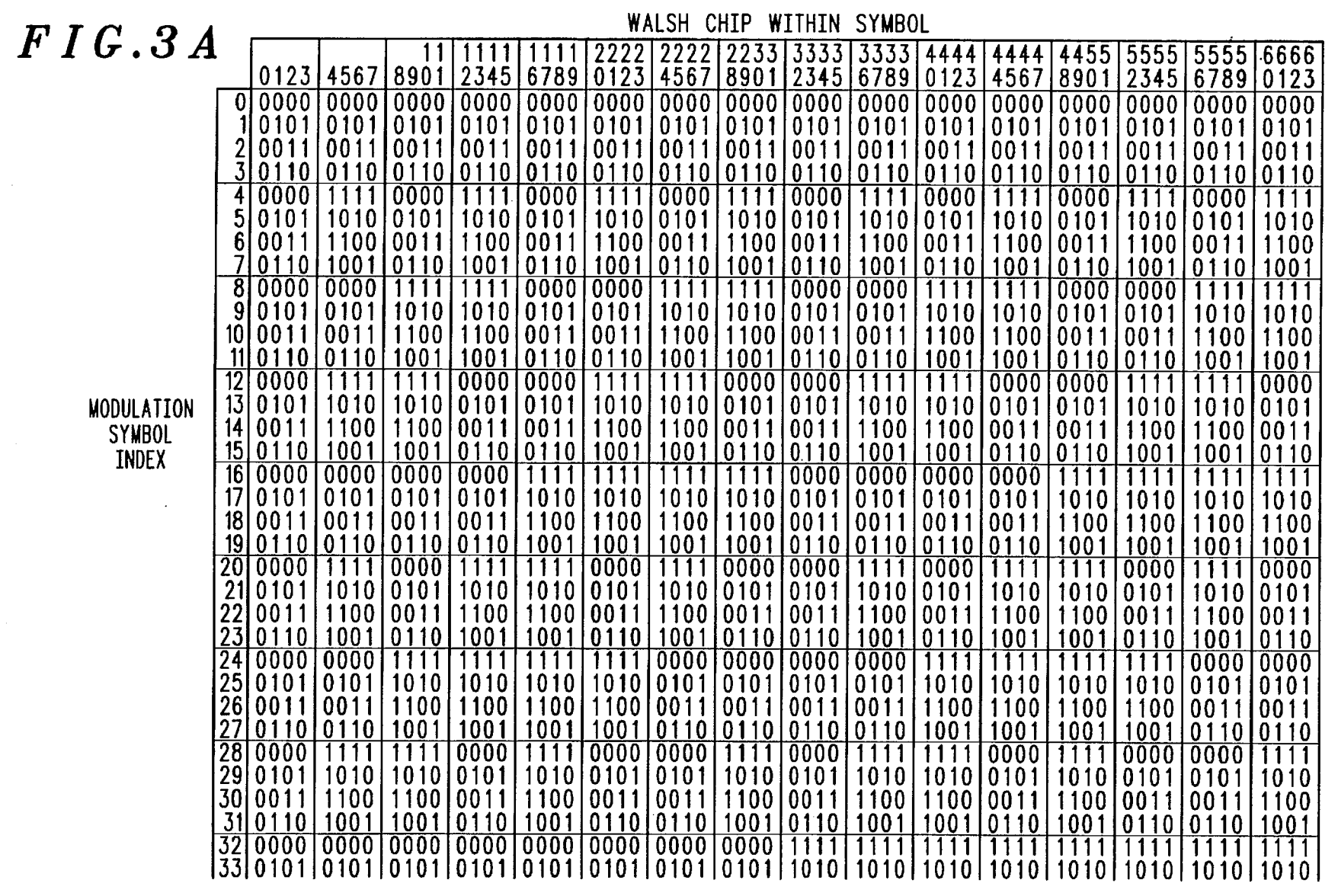
Figure 3B:
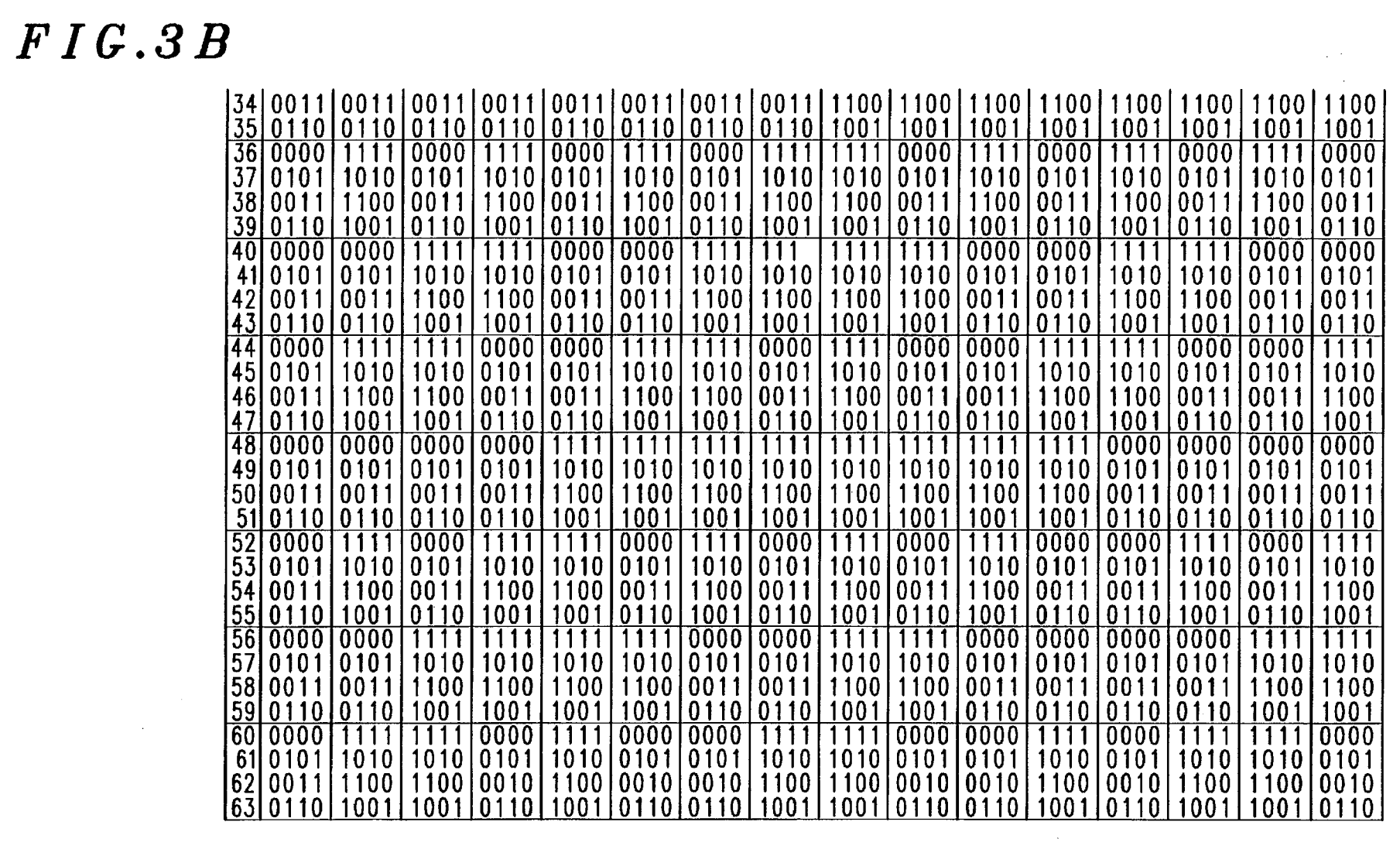

A block diagram of an IS-95 compatible transmitter 200 for use in the system depicted in FIG. 1 is generally depicted in FIG. 2. In this embodiment, the transmitter 200 resides in any of the BTSs 101–103. A voice (or data) signal 203 is input to a coding/interleaving section 206, resulting in a coded/interleaved signal 209. The coded/interleaved signal 209 is mapped, preferably, six symbols at a time, to a unique 64-ary orthogonal modulator 212. In the preferred embodiment, the 64-ary orthogonal modulator is a Walsh matrix, as shown in FIG. 3. The six coded symbols are mapped by the equation $C0+2C_1+4C_2+8C_3+16C_4+32C_5=i$, where $C_{0-5}$ are the coded symbols and i is the index of the output Walsh symbol. Because the symbols are either 1 or 0, the equation uniquely maps the six symbols into one of the 64 Walsh indexes. The output of the 64-ary modulator 212 is a Walsh symbol which is made up of 64 Walsh chips (i.e., a row in the Walsh matrix depicted in FIG. 3).

Connected to the 64-ary modulator 212 is a modulo 2 adder 215 which sums a long pseudorandom noise (PN) sequence 218 with the Walsh chips. The output of the adder 215 is split into an in-phase (I) channel 221 and a quadrature-phase (Q) channel 224. The I channel 221 includes an adder 227 which sums the output of the adder 215 with an I PN sequence 230. The Q channel 224 includes an adder 233 which sums the output of the adder 215 and a Q PN sequence 236. The adder 233 is connected to a delay element 239. At this point, the I and Q data are mapped to +1 (i.e., a zero is mapped into a +1 and a 1 is mapped into a −1) and bandpass filtered 242, 243, mixed 245, 246 and summed 248 to create the radio frequency (RF) signal 251 which is transmitted to a MS 105 or 106 via an antenna 254. This results in offset QPSK modulation of the input voice (or data) signal 203.

Figure 4:
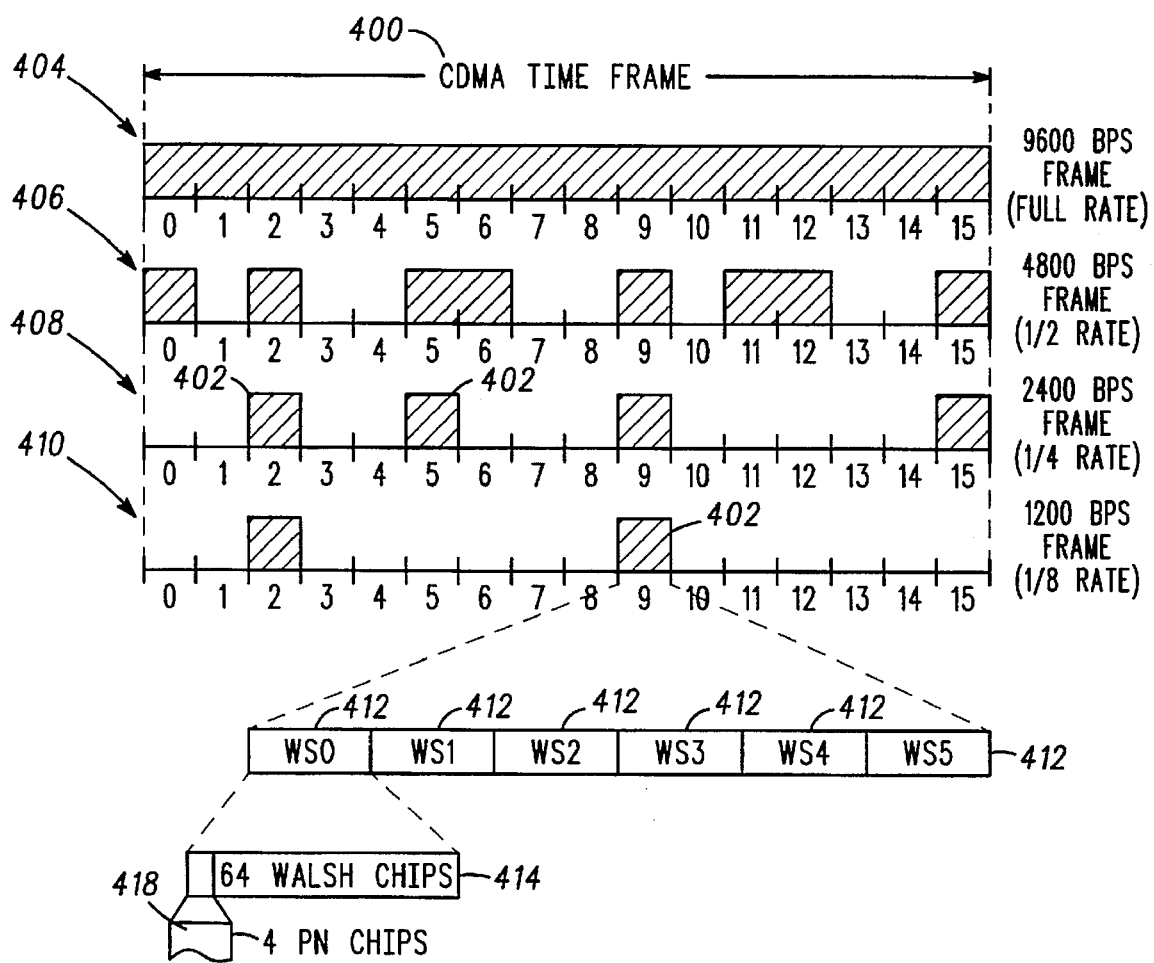
FIG. 4 generally depicts transmissions of various rate data during a CDMA time frame.

The input voice (or data) signal 203 can be coded by the coder 206 at either full rate (9600 bps) 404, half rate (4800 bps) 406, quarter rate (2400 bps) 408, or eighth rate (1200 bps) 410. FIG. 4 shows examples of transmissions of variable rate data within a CDMA Time Frame 400. The time frame 400 is made up of sixteen power control groups (PCGs) 402. The PCGs 402 are made up of six Walsh symbols 412 and each Walsh symbol 412 is defined by 64 Walsh chips 414. Finally, each Walsh chip 414 has four PN chips 418. The incoming data rate, (full, half . . . ) is determined by the voice activity of the user. Periods containing unvoiced speech or silences are encoded at eighth rate, while continuous voiced speech might be encoded at full rate. Which power control groups are active during the CDMA Time Frame 100 is determined by the long code 218 and by the amount of voice activity.

Figure 5:
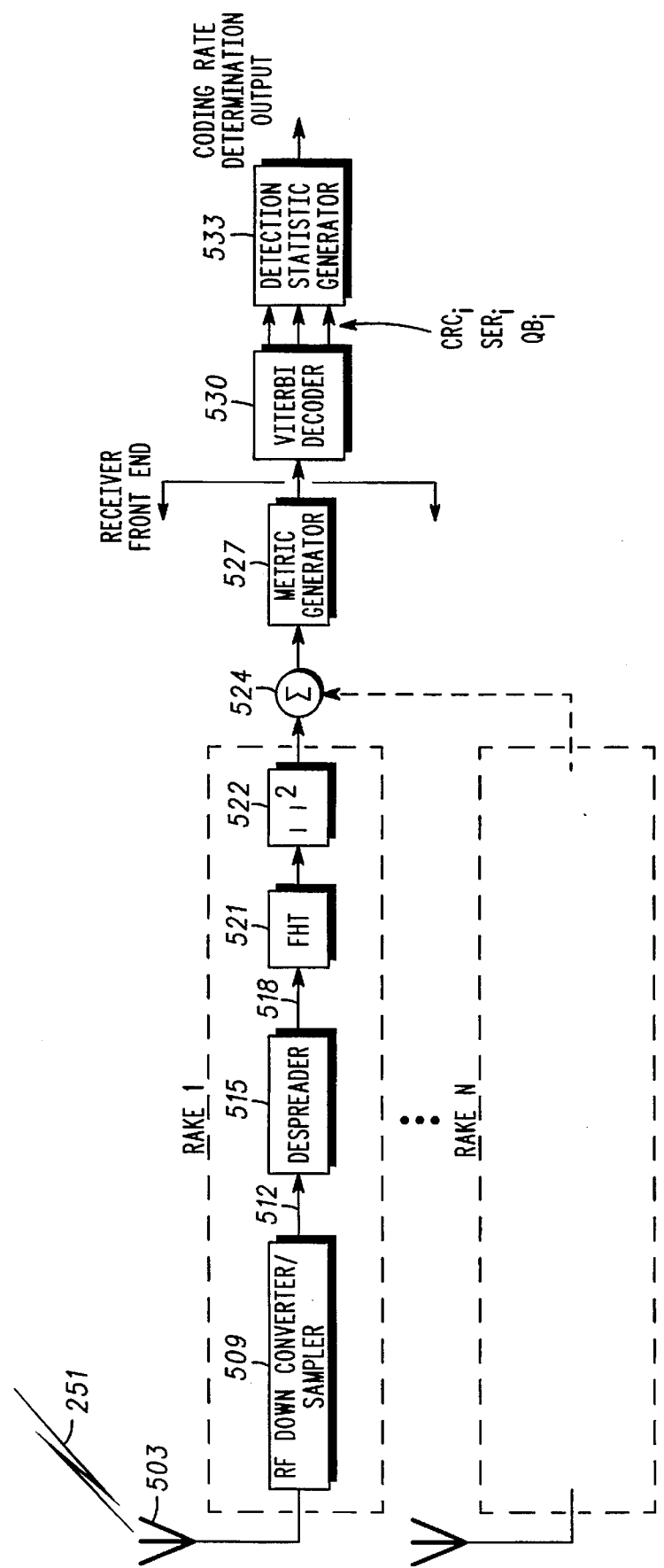
FIG. 5 generally depicts a receiver implemented in a base transceiver station (BTS) which determines coding rate in accordance with the invention.

FIG. 5 generally depicts a receiver 500 in a BTS 101–103 which determines coding rate in accordance with the invention. In actual implementation, the receiver 500 to be used would be a four-path (or four-"finger") RAKE receiver, the general structure of which is well known in the art. As shown in FIG. 5, the receiver 500 depicts only a single finger (RAKE 1) of the above-mentioned four-finger RAKE receiver. Referring to FIG. 5, an antenna 503 receives the signal 251 over a radio frequency (RF) communication resource which contains user information coded at one of a plurality of coding rates. In the preferred embodiment, the coding rates are full rate, ½ rate, ¼ rate and ⅛ rate, implementation of which is well known in the art.

Upon reception by the antenna 503, the signal 251 is input into a RF downconverter/sampler 509 which processes the signal 251 with well known techniques to obtain an oversampled (e.g. eight times oversampled) baseband representation 512 of the signal 251. The baseband representation 512 is input into a despreader 515 which reverses the known transmission modulation of offset QPSK using the long code PN sequence and the I and Q PN sequences. The despread signal 518 is then input into a Fast Hadamard Transform (FHT) 521, which correlates each group of sixty four despread samples corresponding to a Walsh symbol 412 of the PCG 402 against each of the sixty four possible Walsh codewords to generate 64 correlations as is known in the art. Each of the 64 correlations at the output of the FHT 521 is magnitude squared 522 and summed, via a summing node 524, with the corresponding squared correlations at the FHT output from the other RAKE fingers, and the summed squared correlations at the output of the summing node 524 are input into a metric generator 527. The metric generator attempts to estimate which Walsh indexes (based on the I and Q magnitudes) were transmitted for each Walsh symbol 412 of the PCG 402 and generates the decoding metrics of each of the index bits. The output from the metric generator 527 is input into a Viterbi decoder 530.

As is well known in the art, the Viterbi decoder 530 reconstructs the data 203 which was transmitted in the signal 251. The construction is performed for all four possible rates. The Viterbi decoder 530 also generates parameters which are indicative of the likelihood of coding at the plurality of coding rates, and are thus useful in the coding rate determination performed by the receiver 500. As shown in FIG. 5, the parameters include cyclic redundancy check (CRC) information, symbol error rate (SER) information, and quality bit (QB) information. The subscript i associated with each parameter (i.e., $CRC_i$, $SER_i$ and $QB_i$) represents parameters being output for each possible coding rate. Thus, the Viterbi decoder 530 outputs 12 different parameters ($CRC_{full\ rate}$, $SER_{full\ rate}$, $QB_{full\ rate}$, $CRC_{1/2\ rate}$, $SER_{1/2\ rate}$, $QB_{1/2\ rate}$, and so on) for every frame transmitted. For a general discussion of the SER associated with a Viterbi decoder, see U.S. Pat. No. 5,321,705 to Gould et al., assigned to the assignee of the present application. For a general discussion of the QB associated with a Viterbi decoder, see "Viterbi Decoding Algorithm for Convolutional Codes with Repeat Request" by N. Yamamoto and K. Itoh, IEEE Trans on Information Theory, Vol. IT-26, No. 5, Sept. 1980.

It should be noted here that the spread spectrum wireless communication system defined by IS-95 is capable of supporting different speech service options (as defined in IS-96). For example, one speech service option is the default 8 kbps speech service option, commonly referred to as Rate Set 1. Another speech service option is the 14.4 kbps speech service option, defined for personal communication systems (PCS) and commonly referred to as Rate Set 2. The coding rate determination functions described below in accordance with the invention are rate set dependent. For example, the coding rate determination function for Rate Set 1 (default speech) exploits a-priori information concerning the allowable rate transitions at the speech coder 206 to discriminate between ¼ rate frames and ⅛ rate frames. On the other hand, the coding rate determination function for rate set 2 (14.4 kbps speech) makes use of different constraints placed on the speech coder 206 and also leverages the enhanced CRC coding presented in Rate Set 2 (for Rate Set 1, only the full and ½ rates undergo CRC, while for Rate Set 2, all rates undergo CRC). The techniques described in accordance with the invention can be easily extended to other speech service options (for example, the enhanced variable rate coding, or EVRC, speech service option) as desired.

As stated above, the Rate Set 1 coding rate determination function is based on the estimated channel symbol error rate (SER), decoding quality bit (QB), and CRC checks obtained from the Viterbi decoder 530 operating under each rate hypothesis. The Rate Set 1 coding rate determination function is performed in the detection statistic generator block 533 as shown in FIG. 5. In the preferred embodiment, the detection statistic generator block 533 is implemented using a 56166 digital signal processor (DSP).

Figure 6:
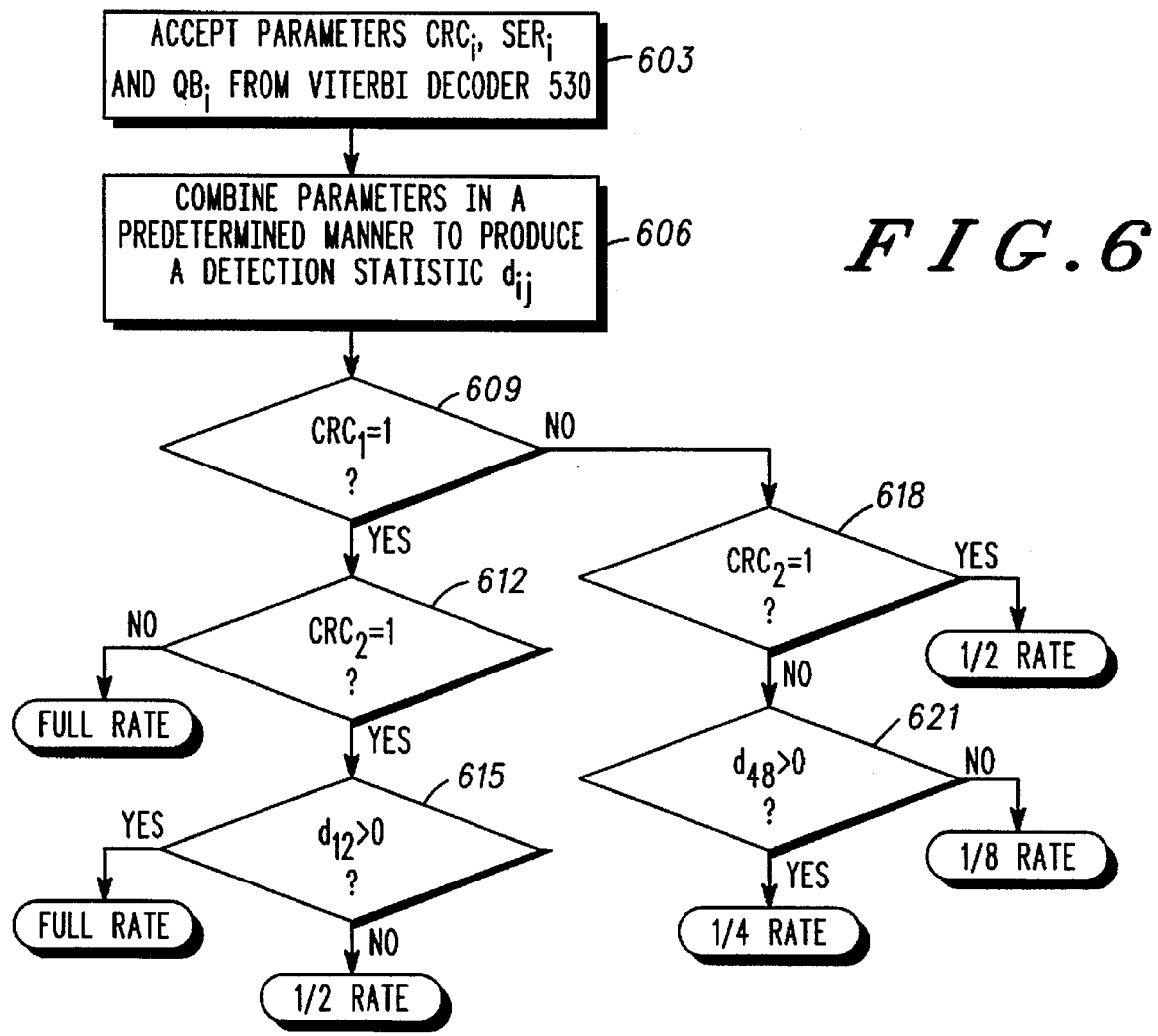
FIG. 6 generally depicts, in flow diagram form, the coding rate determination function (for Rate Set 1 ) in accordance with the invention.

FIG. 6 generally depicts, in flow diagram form, the coding rate determination function (for Rate Set 1) in accordance with the invention. Referring to FIG. 6, the coding rate determination process begins by accepting, at step 603, the parameters $CRC_i$, $SER_i$ and $QB_i$ from the Viterbi decoder 530. The process then combines, at step 606, the parameters in a predetermined manner to produce a detection statistic $d_{ij}$, where i represents one possible rate and j another. At steps 609 and 612, the CRC status of the two highest possible rates (i.e., full rate and ½ rate) are checked. If both CRCs check (i.e., the tests at steps 609 and 612 are both [Y]es), the parameters are combined in a predetermined manner to produce the detection statistic $d_{12}$. At step 615, the coding rate is determined based on the detection statistic $d_{12}$. Stated specifically, if the detection statistic $d_{12}$ at step 615 is greater than 0, then the coding rate of the transmitted data is determined to have been full rate. However, if the detection statistic $d_{12}$ at step 615 is less than 0, then the coding rate of the transmitted data is determined to have been ½ rate. If, from tests 609 and 612, only the full rate CRC checks, the coding rate is declared to have been full rate coding. If, from tests 609 and 618, only the ½ rate CRC checks, the coding rate is declared to have been ½ rate coding.

If neither of the CRCs check at steps 609 and 618 (i.e., the tests at steps 609 and 618 are both [N]o), the parameters are combined in a predetermined manner to produce the detection statistic $d_{48}$. At step 621, the coding rate is determined based on the detection statistic $d_{48}$. Stated specifically, if the detection statistic $d_{48}$ at step 621 is greater than 0, then the coding rate of the transmitted data is determined to have been ¼ rate. However, if the detection statistic $d_{48}$ at step 621 is less than 0, then the coding rate of the transmitted data is determined to have been ⅛ rate. By using the detection statistics $d_{ij}$ which represents the parameters $CRC_i$, $CRC_j$, $SER_i$, $SER_j$, $QB_i$ and $QB_j$ combined in a predetermined manner, the receiver 500 can accurately determine the coding rate of the data signal transmitted in accordance with the invention.

The derivation of the detection statistic, $d_{ij}$, proceeds as follows. First, a 4-dimensional space, $\Psi_{ij}$, is established which is spanned by $SER_i$, $SER_j$, $QB_i$ and $QB_j$ where $SER_i$ and $SER_j$ are the normalized (to the full rate) symbol error rates for rate i and rate j. This is defined as the count of received convolutionally coded symbols that do not agree with the symbols resulting from re-encoding the decoded information bits. A linear discriminant function is then used to combine the parameters in a predetermined manner to produce the detection statistic:

$$d_{ij}(\underline{x})=\underline{w}^t\underline{x}+w_0=w_1SER_i+w_2SER_j+w_3QB_i+w_4QB_j+w_0$$

where $$\underline{w}_{ij}=[w_1 w_2 w_3 w_4]^t \text{ and } \underline{x}=[SER_i SER_j QB_i QB_j]^t$$

and where $\underline{w}$ is the weight vector and $w_0$ is the decision boundary. The selection of $\underline{w}$ directly affects the performance of the discriminant function. Obviously, $\underline{w}$ should be determined according to how much discriminant information each variable in $\underline{x}$ contains as well as the physical magnitude each variable takes. It can be shown that the optimal weight vector that minimizes the rate decision error is:

$$w_{ij} = \frac{\sum\limits_{ij}^{-1}(\underline{\eta}_i - \underline{\eta}_j)}{\|\sum\limits_{ij}^{-1}(\underline{\eta}_i - \underline{\eta}_j)\|}$$

The parameters, $\Sigma_{ij}$ and $\eta_i$, $\eta_j$ can be experimentally estimated. The resulting detection statistics are (all SERs are normalized to full rate):

$d_{12} = -0.06297 SER_1 + 0.03884 SER_2 + QB_1 - QB_2 + 1.0$ $d_{12}' = -0.06297 SER_1 + 0.3884 SER_2$ $d_{14} = -0.4723 SER_1 + 0.2203 SER_4$ $d_{18} = -0.3362 SER_1 + 0.1177 SER_8$ $d_{24} = -0.3012 SER_2 + 0.1988 SER_4$ $d_{28} = -0.2396 SER_2 + 0.1097 SER_8$ $d_{48} = -0.01535 SER_4 + 0.00986 SER_8 + QB_4 - QB_8 + 0.4 + \delta$ $d_{48}' = -0.1535 SER_4 + 0.09865 SER_8$ where $\delta$ is dependent on the rate of the previous frame:

$$\delta = \begin{cases} 0.5, & \text{if rate}(n-1) = 2 \\ 0.0, & \text{otherwise} \end{cases}$$

i.e., the decision boundary is biased towards ¼ rate if the previous frame rate is ½ rate.

Important to note is that the Rate Set 1 coding rate determination function takes advantage of the rate constraints defined in the IS-96-A speech coder. The rate constraints imposed is that the data rate is only permitted to decrease by one rate per frame. This information is incorporated into the decision boundary of the detection statistics $d_{ij}$. That is, the decision boundary is variable according to the data rate of the previous frame. The decision rule is:

choose rate $i$ if $d_{ij}(x) > 0$ choose rate $j$ if $d_{ij}(x) < 0$ where i, j=1,2,4,8 and i≠j.

In the Rate Set 1 coding rate determination flowchart depicted in FIG. 6, the following constants apply:

$\alpha_1 = -45, \beta_1 = -40, \gamma_1 = -35$ $\alpha_2 = -35, \beta_2 = -20, \gamma_2 = -20$ $\alpha_4 = 0.5, \beta_4 = 3.0, \gamma_4 = -34, \delta_4 = -15$ $\alpha_8 = 3.0, \beta_8 = 0.5, \gamma_8 = -30, \delta_8 = -$ In the preferred embodiment, the discriminant function used to combine the parameters is linear, thus scaling will not affect performance. Therefore, the detection statistics can be rescaled to fit various fit various hardware implementations. The $\alpha$ and $\beta$ coefficients should also be scaled by the same corresponding factors.

Figure 7:
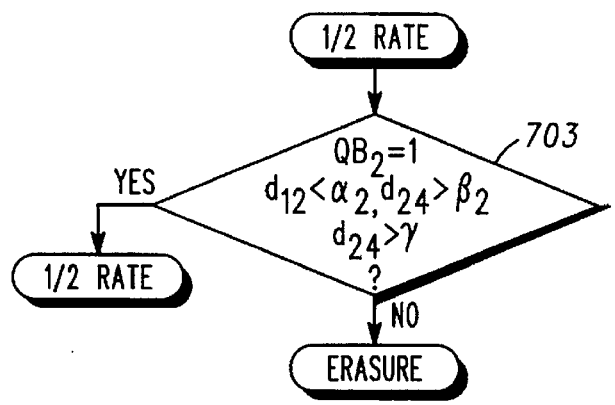
FIG. 7 generally depicts, in flow diagram form, the process for erasing a frame (for Rate Set 1) using detection statistics dij in accordance with the invention.
Figure 7:
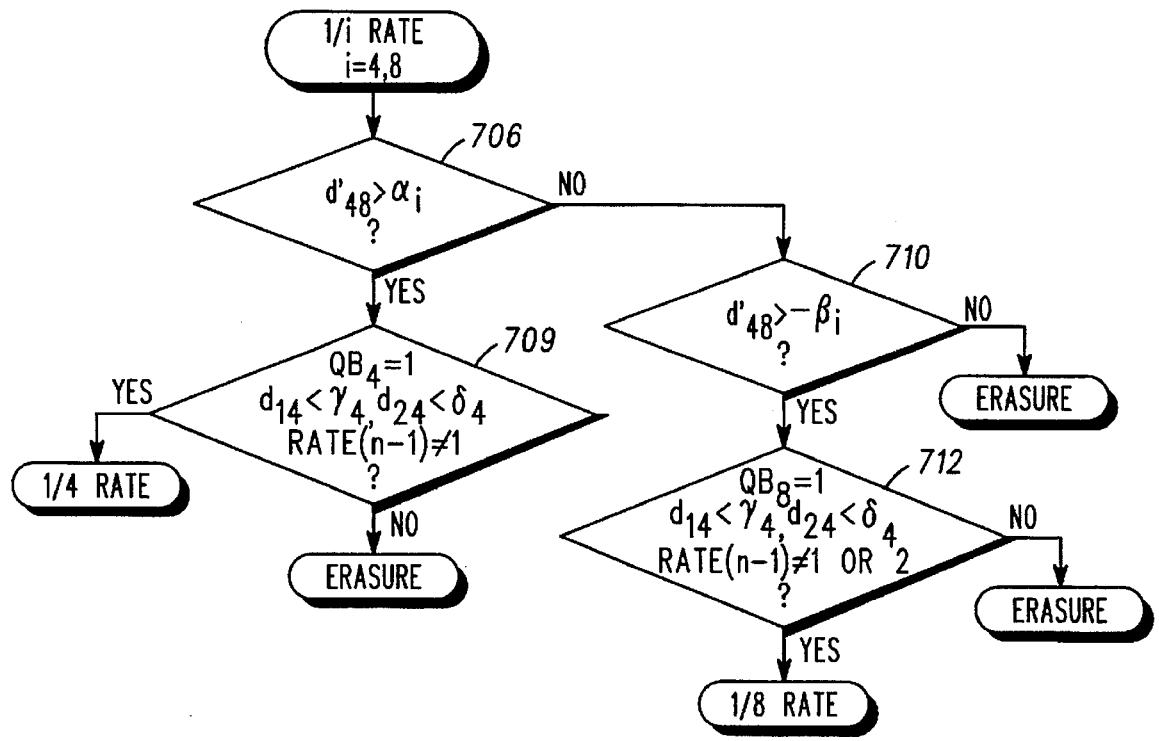

Once the coding rate has been determined, the receiver 500 can determine whether the frame received is either to be kept (i.e., a good frame) or erased (i.e., a bad frame). FIG. 7 generally depicts, in flow diagram form, the process for erasing a frame using detection statistics $d'_{ij}$ in accordance with the invention. For frames declared full rate, the CRC and $d'_{1j}$ (j=2, 4, 8) are used for erasure detection. For half rate frames, the CRC and $d'_{12}$, $d'_{2j}$ (j=4, 8) as well as the quality bit QB, at step 703, are used to check if the frame is good. Since there are no CRCs for the two lowest rates, erasure detection is carried out by checking quality bit QB and corresponding $d'_{ij}$s at step 706, 709, 710, and 712.

The coding rate determination function for Rate Set 2 is different to some degree from that of Rate Set 1 since, in Rate Set 1, ¼ and ⅛ rate frames are not provided with a CRC while in Rate Set 2, all rates are provided with a CRC. Additionally, in Rate Set I, full rate frames are further protected by a BCH codeword in the speech coder 206, which is not the case for Rate Set 2. Finally, Rate Set 1 and 2 place different rate constraints on the speech coder 206. As noted above, the coding rate constraints imposed in Rate Set 1 is that the data rate is only permitted to decrease by one rate per frame; in Rate Set 2, the data rate is permitted to decrease by no more than two rates per frame.

Figure 8A:
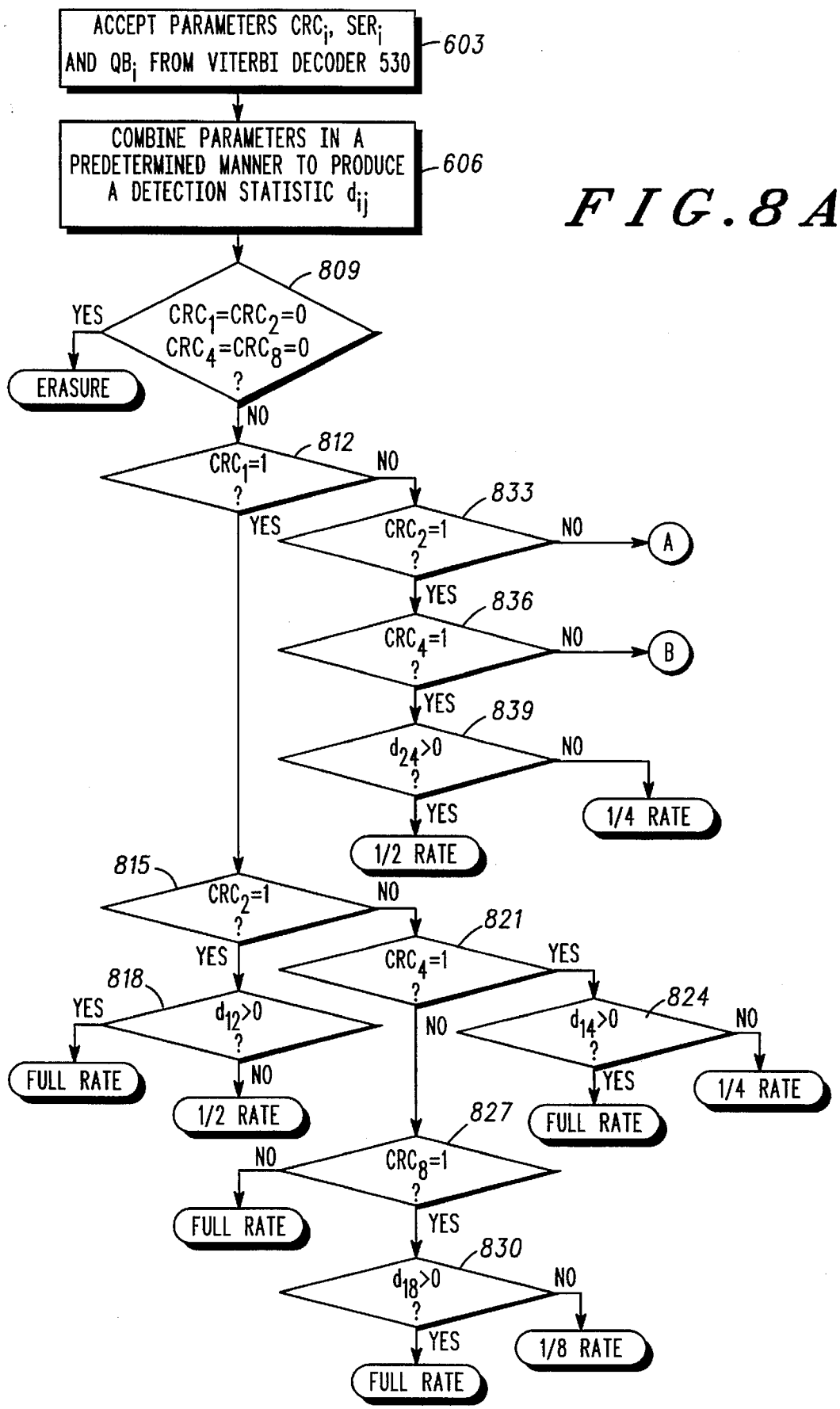
FIG. 8 generally depicts, in flow diagram form, the coding rate determination function (for Rate Set 2) in accordance with the invention.
Figure 8B:
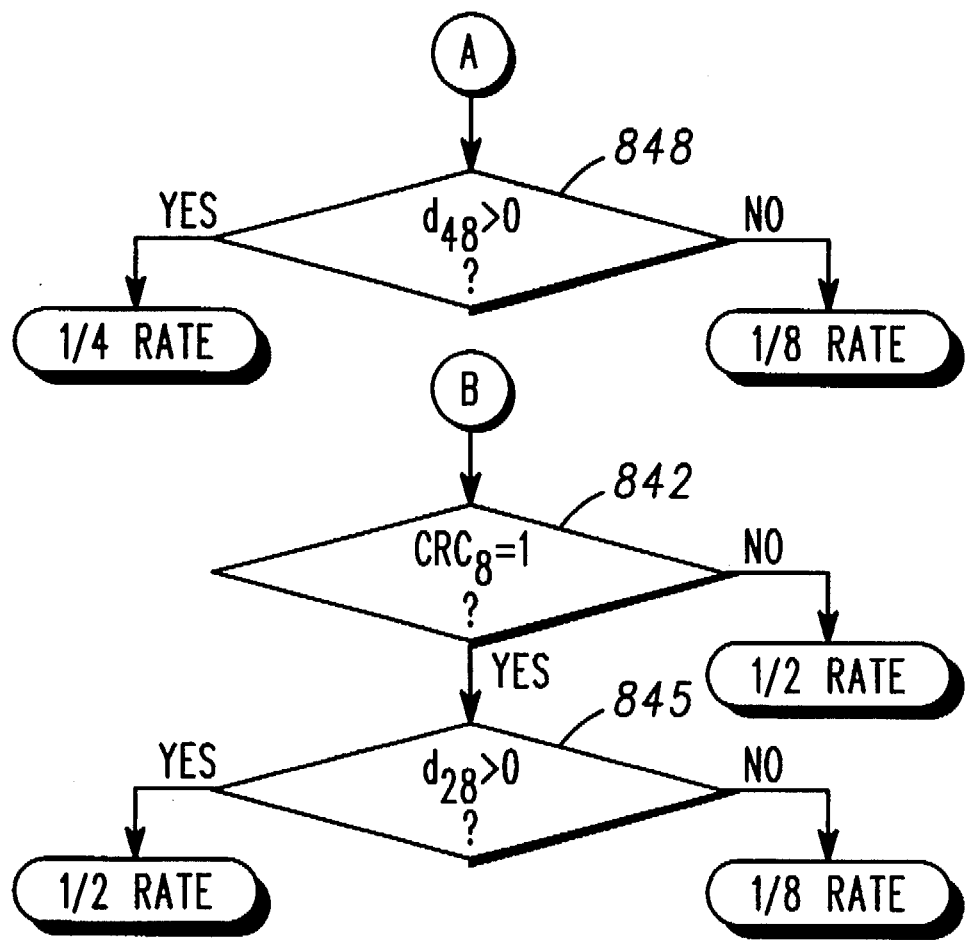

FIG. 8 generally depicts, in flow diagram form, the Rate Set 2 coding rate determination function in accordance with the invention. As in the Rate Set 1 function, the Rate Set 2 coding rate determination begins by accepting, at step 803, the parameters $CRC_i$, $SER_i$ and $QB_i$ (i=1, 2, 4, 8) from the Viterbi decoder 530. The process then combines, at step 806, the parameters in a predetermined manner to produce a detection statistic $d_{ij}$, where i represents one possible rate and j another. The process then checks, at step 809, whether all of the CRCs are bad. If all CRCs are bad, the frame is more than likely a bad frame (regardless of its rate), thus that frame is erased. If one of the CRCs is good, the process proceeds to step 812, where the CRC for full rate is checked. If at steps 812 and 815 the CRCs for full and ½ rate are good, the detection statistic $d_{12}$ is used to determine the coding rate. Specifically, at step 818, if the detection statistic $d_{12}$ is greater than zero, a full rate frame is declared to have been transmitted. If, however, the detection statistic $d_{12}$ is less than zero, a ½ rate frame is declared to have been transmitted.

Referring back to step 815, if the CRC for ½ rate is not good, the process proceeds to step 821 where the CRC for ¼ is checked. If that CRC is good, the detection statistic $d_{14}$ is used to determine the coding rate. Specifically, at step 824, if the detection statistic $d_{14}$ is greater than zero, a full rate frame is declared to have been transmitted. If, however, the detection statistic $d_{14}$ is less than zero, a ¼ rate frame is declared to have been transmitted.

Referring back to step 821, if the CRC for ¼ rate is not good, the process proceeds to step 827 where the CRC for ⅛ is checked. If that CRC is not good, a full rate frame is declared to have been transmitted. If that CRC is good, the detection statistic $d_{18}$ is used to determine the coding rate. Specifically, at step 830, if the detection statistic $d_{18}$ is greater than zero, a full rate frame is declared to have been transmitted. If, however, the detection statistic $d_{18}$ is less than zero, a ⅛ rate frame is declared to have been transmitted.

An entirely different set of detection statistics are implemented if the test at step 812 is negative. In this situation, the process proceeds to step 833 where the CRC for ½ rate is checked. If that CRC is good, then the CRC for ¼ rate is checked at step 836 and, if good, the detection statistic $d_{24}$ is used to determine the coding rate. Specifically, at step 839, if the detection statistic $d_{24}$ is greater than zero, a ½ rate frame is declared to have been transmitted. If, however, the detection statistic $d_{24}$ is less than zero, a ¼ rate frame is declared to have been transmitted.

Referring back to step 836, if the CRC for ¼ rate is not good, the process proceeds to step 842 where the CRC for ⅛ rate is checked. If that CRC is bad, a ½ rate frame is declared to have been transmitted. If, however, that CRC is good, the detection statistic $d_{28}$ is used to determine the coding rate. Specifically, at step 845, if the detection statistic $d_{28}$ is greater than zero, a ½ rate frame is declared to have been transmitted. If, however, the detection statistic $d_{28}$ is less than zero, a ⅛ rate frame is declared to have been transmitted.

Referring back to step 833, if the CRC for ½ rate is not good, then the process proceeds to step 848 where the detection statistic $d_{48}$ is used to determine the coding rate. Specifically, at step 848, if the detection statistic $d_{48}$ is greater than zero, a ¼ rate frame is declared to have been transmitted. If, however, the detection statistic $d_{48}$ is less than zero, a ⅛ rate frame is declared to have been transmitted. By using the detection statistics $d_{ij}$ in accordance with the invention, the receiver is able to accurately determine the coding rate of the data signal transmitted in accordance with the invention.

Figure 9:
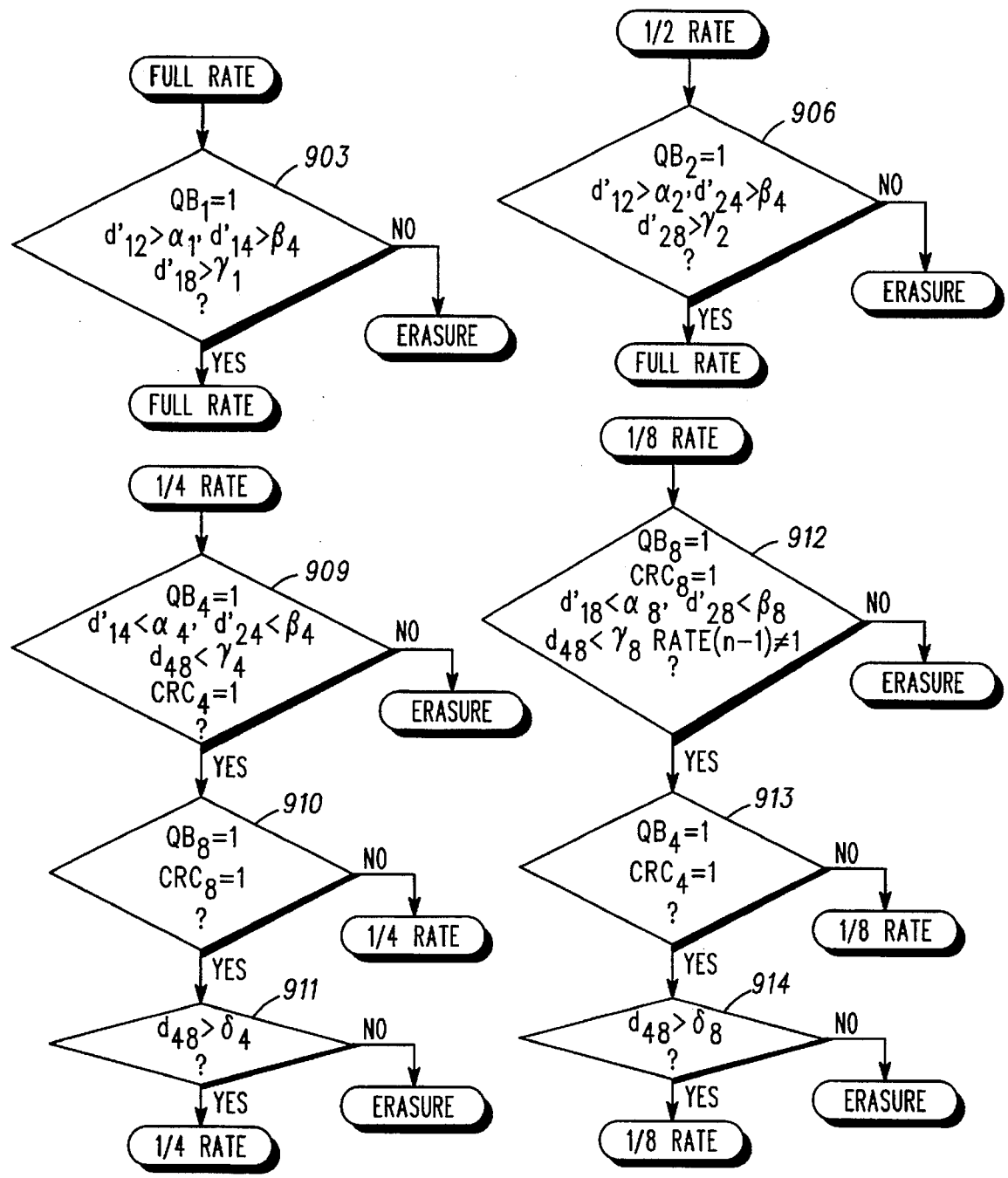
FIG. 9 generally depicts, in flow diagram form, the process for erasing a frame (for Rate Set 2) using detection statistics dij in accordance with the invention.

As in the case for Rate Set 1, once the coding rate is determined, the receiver 500 can determine whether the frame received is either to be kept (i.e., a good frame) or erased (i.e., a bad frame). FIG. 9 generally depicts, in flow diagram form, the process for erasing a frame using detection statistics $d_{ij}$ in accordance with the invention. Referring to FIG. 8 and FIG. 9, steps 903 and 906 check the full and ½ rates, and an erasure is declared if either the associated $d_{ij}$s or the quality bit do not check. For the two lowest rates, erasure detection is carried out by checking CRC, QB and associated $d_{ij}$s as shown in steps 909–914.

As stated above, for Rate Set 2, the coding rate is permitted to decrease by no more than two rates per frame. Stated differently, for a Rate Set 2 coder, if the previous frame was selected for full rate coding, the current frame will can only be coded at ½ or ¼ rate, but not at ⅛ rate. This constraint is taken into account in the detection statistics $d_{ij}$ for Rate Set 2 listed below.

$d_{12}=-0.06382SER_1+0.03849SER_2+QB_1-QB_2+2.3$ $d_{12}=-0.6382SER_1+0.3849SER_2$ $d_{14}=-0.04468SER_1+0.02237SER_4+QB_1-QB_4+2.1$ $d_{14}=-0.4468SER_1+0.2237SER_4$ $d_{18}=-0.03285SER_1+0.01181SER_8+QB_1-QB_8+1.7$ $d_{18}=0.3285SER_1+0.1181SER_8$ $d_{24}=-0.03367SER_2+0.01848SER_4+QB_2-QB_4+1.5$ $d_{24}=-0.3367SER_2+0.1848SER_4$ $d_{28}=-0.02512SER_2+0.01081SER_8+QB_2-QB_8+1.3$ $d_{28}=-0.2512SER_2+0.1081SER_8$ $d_{48}=-0.01706SER_4+0.009138SER_8+QB_4-QB_8+0.8+\delta$ $d_{48}=-0.1706SER_4+0.09138SER_8$ where $\delta=0.2$ if the previous frame rate is full rate and zero otherwise. Additionally, the following constants apply for the Rate Set 2 coding rate determination function described above with reference to FIG. 8:

$\alpha_1=-40, \beta_1=-30, \gamma_1=-25$ $\alpha_2=-10, \beta_2=-25, \gamma_2=-20$ $\alpha_4=-8, \beta_4=3, \gamma_4=14, \delta_4=0.5$ $\alpha_8=-12, \beta_8=-8, \gamma_8=-2, \delta_8=-0.5$ Finally, the scaling rule described above with reference to Rate Set 1 is likewise valid for Rate Set 2.

While the invention has been particularly shown and described with reference to a particular embodiment, it will be understood by those skilled in the art that various changes in form and details may be made therein without departing from the spirit and scope of the invention. For example, coding rate determination in accordance with the invention has been described as being implemented in a receiver in a BTS, but the coding rate determination can likewise be implemented in a receiver in a MS. Additionally, all parameters $CRC_i$, $SER_i$ and $QB_i$ have been combined in a predetermined manner in the preferred embodiment to produce the detection statistic $d_{ij}$, but various combinations of the parameters can be beneficially utilized without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of determining coding rate in a receiver implemented in a wireless communication system, the receiver responsive to a communication resource containing user information coded at one of a plurality of coding rates, the method comprising the steps of:

generating parameters indicative of the likelihood of coding at the plurality of coding rates;

combining the parameters in a predetermined manner to produce a detection statistic; and determining the coding rate based on the detection statistic.

2. The method of claim 1, wherein the parameters indicative of the likelihood of coding at the plurality of coding rates further comprise cyclic redundancy check (CRC) information, symbol error rate (SER) information, and quality bit (QB) information.

3. The method of claim 1, wherein the step of combining the parameters in the predetermined manner to produce the detection statistic further comprises combining the parameters in a linear discriminant function to produce a detection statistic.

4. The method of claim 1, wherein the detection statistic represents two possible coding rates.

5. The method of claim 4, wherein the linear discriminant function is defined by $$d_{ij}(x)=\underline{w}'\underline{x}+w_0=w_1SER_i+w_2SER_j+w_3QB_i+w_4QB_j+w_0$$

where i and j are the two possible coding rates.

6. A receiver for determining the coding rate of user information transmitted in a wireless communication system, the receiver responsive to a communication resource containing the user information, the user information coded at one of a plurality of coding rates, the receiver comprising:

a receiver front end which receives and demodulates the communication resource to produce demodulated user information;

a decoder, coupled to the receiver front end, which decodes the demodulated user information and generates parameters indicative of the likelihood of coding at the plurality of coding rates;

a processor, coupled to the decoder, for combining the parameters in a predetermined manner to produce a detection statistic and determining the coding rate based on the detection statistic.

7. The receiver of claim 6, wherein the parameters indicative of the likelihood of coding at the plurality of coding rates further comprise cyclic redundancy check (CRC) information, symbol error rate (SER) information, and quality bit (QB) information.

8. The receiver of claim 6, wherein the processor combines the parameters in a linear discriminant function to produce the detection statistic.

* * * * *